E. H. MUMFORD, DEC'D.
R. S. MUMFORD, EXECUTRIX.
MOLDING MACHINE.
APPLICATION FILED OCT. 20, 1915.
Reissued Oct. 15, 1918.
14,536.
2 SHEETS—SHEET 1.
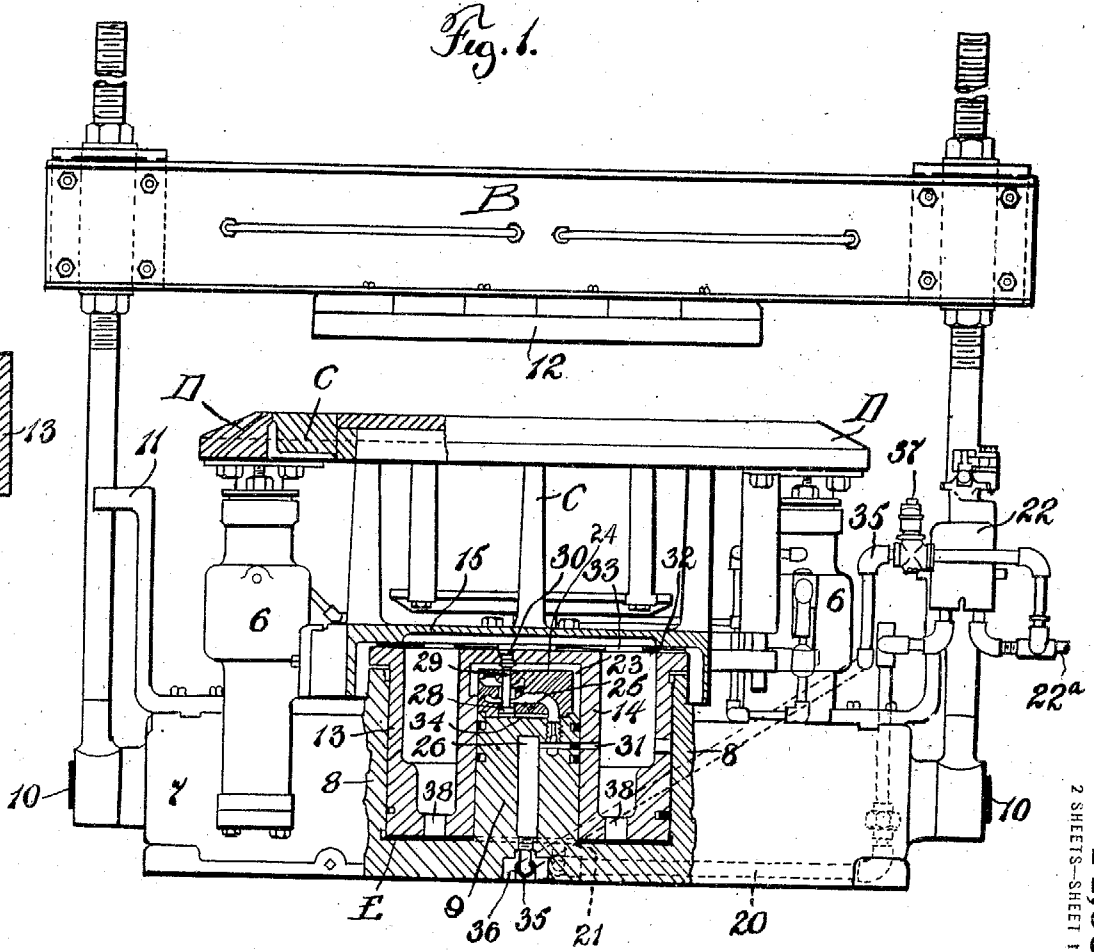
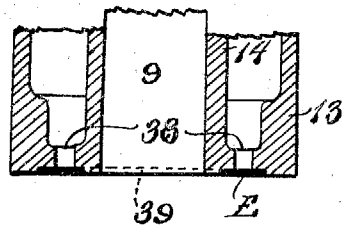
Inventor
Rose S. Mumford
Executrix Estate of E.H. Mumford Deceased
by Symmes Redt Bradley Lechner & Fowler
Attys E. H. MUMFORD, DEC'D.
R. S. MUMFORD, EXECUTRIX.
MOLDING MACHINE.
APPLICATION FILED OCT. 20, 1915.

Reissued Oct. 15, 1918.

14,536.
2 SHEETS—SHEET 2.

Inventor
Rose S. Mumford
Executrix Estate of E. H. Mumford Deceased
by
Symmes Todd & Bradley Lechner & Forbes
Attys

UNITED STATES PATENT OFFICE.

EDGAR H. MUMFORD, DECEASED, LATE OF PLAINFIELD, NEW JERSEY, BY ROSE S. MUMFORD, EXECUTRIX, OF PLAINFIELD, NEW JERSEY.

MOLDING-MACHINE.

14,536. Specification of Reissued Letters Patent. Reissued Oct. 15, 1918.

Original No. 1,151,213, dated August 24, 1915, Serial No. 19,931, filed April 3, 1915. Application for reissue filed October 20, 1915. Serial No. 57,002.

*To all whom it may concern:*

Be it known that EDGAR H. MUMFORD, late a citizen of the United States, residing at Plainfield, in the county of Union and State of New Jersey, has invented certain new and useful Improvements in Molding-Machines, of which the following is a specification.

This invention relates to molding machines, and has for its primary object the provision of an improved molding machine which is a combined squeeze and jolt rammer, that is to say, the machine may be used for either a squeezing operation or a jolt ramming operation. One of the more specific objects of the invention is the provision of a machine having the characteristics specified, which is simple and compact in construction, in which the number of parts is reduced to a minimum, and which is efficient in operation. The invention also contemplates the provision of an improved apparatus of the character described which is so constructed that it can, at will, be used either in carrying on a squeezing operation or a jolt ramming operation, and this in a very simple and expeditious manner without disturbing any of the mechanism. The foregoing, together with such other objects as may hereinafter appear or are incident to the invention, is attained by means of a construction which is illustrated in preferred form in the accompanying drawings, wherein—

Figure 2:
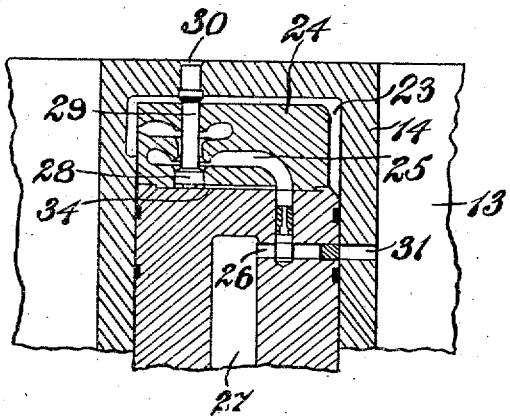
Figure 3:
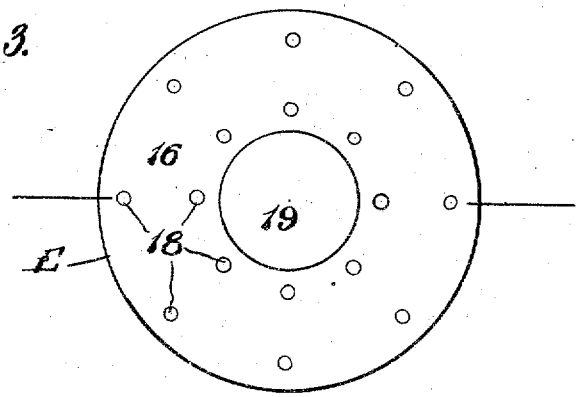
Figure 4:
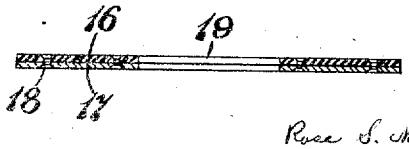

Figure 1 is a front elevation and partial section of a molding machine embodying the invention: Fig. 2 is an enlarged sectional view of a portion of the apparatus shown in Fig. 1; Figs. 3 and 4 are respectively a plan and sectional view of a detail of the apparatus, and Fig. 5 is a sectional view of a modified detail of the invention.

Referring to Fig. 1, the machine comprises a hollow base 7 which forms a housing for the usual form of counter-balance means (not shown) and which—intermediate between its ends—is provided with an upstanding cylindrical portion 8 and an upstanding post or stationary plunger 9 which is disposed centrally within the cylinder 8. In the ends of the base 7 are mounted the shafts 10 which carry the swinging squeezer yoke B which is adapted to be swung into and out of vertical alinement with the molding machine proper, a stop 11 being provided to limit the movement of the yoke. The yoke is provided with the usual platen 12, and its functions will be readily understood.

Mounted in the cylinder 8 for vertical movement is a plunger 13 which is open at one end and which is provided with a centrally located cylindrical portion 14 into which the post or stationary plunger 9 projects. Mounted on the top of the plunger 13 covering the open end thereof is a frame 15 which carries an elevating frame D and pattern carrier mechanism C, such as are shown in Letters Patent of the United States, No. 932,563, issued to the said Edgar H. Mumford August 31, 1909, together with fluid plunger mechanism 6 as shown in Letters Patent of the United States, No. 846,685, issued to the said Edgar H. Mumford March 12, 1907, the operation of such corresponding parts being the same as set forth in said Letters Patent. The mechanism C, D, which is the mechanism upon which the mold parts are carried, may be termed, for the purposes of this specification, a mold table, in its broad sense.

Resting in the bottom of the cylinder 8 and beneath the lower face of the plunger 13 is a combined impact and valve member E which is a disk-like member composed of a layer of sheet leather 16 and a plate of sheet steel 17, preferably secured together by means of the rivets 18, (see Figs. 3 and 4). The central opening 19 in the member E is of a size sufficient to permit the member E to move freely on the post 9, as will further appear.

Fluid pressure from any suitable source of supply is conducted to the cylinder 8 beneath the member E by means of the pipe 20 and the port 21 which is formed in the base 7 and opens into the interior of the cylinder 8 beneath the member E, the supply of pressure to the pipe 20 being governed by the valve mechanism 22 which may be of any preferred type.

The operation of the apparatus thus far described is as follows: Upon the introduction of fluid pressure via the pipe 20 and port 21 into the cylinder 8, the fluid pressure acts against the lower face of the member E and raises the said member, the plunger 13, the frame 15 and its associated parts, together with the flask carried thereby, toward the platen 12, thus effecting a squeezing operation. After the mold is squeezed, the fluid pressure is exhausted and the parts returned to normal position, the stripping of the pattern being effected by the fluid pressure mechanism 6 in the manner shown and described in Letters Patent No. 846,685, above referred to.

Mounted in the fluid pressure chamber 23 formed by the cylinder 14 and plunger 9 is a valve block 24 which is provided with a passageway 25, which communicates at one end with the chamber 23 and at the other end with a port 26 drilled in the post 9 so as to communicate with the chamber 27 thereof. The passageway 25 is controlled by the vertically movable valve 28 which is provided with a stem 29 which normally projects above the upper face of the valve block 24 in position to be engaged by a tappet 30 carried in the top of the cylinder 14. Formed in the wall of the cylinder 14 is an exhaust port 31 which, when the cylinder 14 is in lower position, is covered by the post 9, but which is uncovered and comes into register with the chamber 23 after the cylinder 14 has traveled upward a predetermined distance. The cylinder 14 is spaced away from the frame 15 by means of the bosses 32 so as to provide lateral exhaust passages 33 at the top of the plunger 13 and cylinder 14. A port 34 branches from the passageway 25 and extends beneath the lower face of the valve 28 to control the pressure therebeneath. Fluid pressure is introduced into the chamber 27 of the post 9 by means of the pipe 35 which extends from the main line 22[a] to a central point in the rear of the base 7 from which it extends into the recess 36 formed in the base 7. The pipe 35 is controlled by an independent valve mechanism 37.

The operation of the apparatus when used as a jolt rammer is as follows: Upon the introduction of fluid pressure through the pipe 35, chamber 27, port 26, and passageway 25, into the fluid pressure chamber 23, the cylinder 14, together with the plunger 13, is raised, the valve 28 remaining in open position as set forth in a co-pending application of Edgar H. Mumford Serial No. 34,710, filed June 17, 1915. When the cylinder 14 has moved upwardly a distance sufficient to uncover the exhaust port 31, that is to say, when the exhaust port 31 registers with the chamber 23, the pressure in the chamber exhausts through the port 31 and exhaust passages 33, causing a sudden reduction of pressure in the chamber 23, as a result of which the valve 28 is moved upwardly to close the passageway 25 and cut off further supply of fluid pressure by the pressure which has accumulated in the port 34 beneath the lower face of the valve. The cylinder 14 and plunger 13, together with the parts associated therewith, fall by the action of gravity and impact upon the member E. As the parts approach lowermost position, the tappet 30 engages the stem 29 of the valve 28 and moves the valve to open position, thereby again admitting fluid pressure through the passageway 25 into the chamber 23, causing the parts to be again elevated. This operation is automatically carried on as long as the valve 37 is open. When the mold has been jolt rammed by the repeated impact of the cylinder 14 and plunger 13 on the member E, the supply of fluid pressure to the pipe 35 is cut off by closing the valve 37.

It will be seen that when the machine is being used to carry on a jolt ramming operation, there is a tendency to draw a vacuum in the cylinder 8 below the plunger 13. To overcome this difficulty, and to cause the machine to operate smoothly and efficiently, a plurality of surge ports 38 is provided in the bottom of the plunger 13 through which the air flows freely to opposite sides of the hollow plunger 13. It will be seen from the foregoing that the member E acts as a valve to close the surge ports 38 when the machine is being used for a squeezing operation, and as an impact member against which the plunger 13 and cylinder 14 impact when the machine is being used for a jolt ramming operation. The sheet steel plate 17 acts as a stiffening member holding the leather 16 in proper shape to prevent leakage during the operation of the machine.

The fluid pressure plunger mechanism 6 is used—subsequently to the forming of a mold by either the squeezing operation or the jolt ramming operation described—to strip the mold from the pattern. The pattern carrier mechanism C carries the pattern as set forth in Letters Patent No. 932,563, above referred to, and upon introduction of pressure into the plunger 6, the elevating frame D which carries the flask is raised relative to the pattern carrier mechanism and the pattern, thus stripping the mold free from the pattern.

It will be readily seen that the mechanism is simple, compact and inexpensive, in construction, and that it operates in a simple and efficient manner, and that it can be used at will for a squeezing operation or a jolt ramming operation, to suit the character of the work on hand, without disturbing any of the mechanism in the slightest respect, the change in mode of operation being accomplished easily my manipulation of the valves respectively controlling the supply of fluid pressure to the pipes 20 and 35.

For some classes of work it may be that the leather of the member E will soften the impact to an undesirable extent, and to meet this difficulty, the construction shown in Fig. 5 is provided, in which the plunger is formed with a recess 39 in its lower face large enough to receive the member E. The plunger impacts, therefore, on the bottom of the cylinder, metal to metal.

He claims:

1. A molding machine comprising in combination a cylinder having an internal upstanding post, a plunger in said cylinder having a cylindrical portion engaging said post, means for introducing fluid pressure into said cylinder for a squeezing operation, means for introducing fluid pressure into said cylindrical portion for a jolt ramming operation, and valve mechanism for controlling the supply of fluid pressure.

2. A molding machine comprising in combination a cylinder having an internal upstanding post, a plunger in said cylinder having a cylindrical portion engaging said post, means for introducing fluid pressure into said cylinder for a squeezing operation, means for introducing fluid pressure into said cylindrical portion for a jolt ramming operation, and valve mechanism for independently controlling the supply of pressure for said cylinder and said cylindrical portion.

3. A molding machine comprising in combination a cylinder having an internal upstanding post, a plunger in said cylinder having a cylindrical portion engaging said post, means for introducing fluid pressure into said cylinder for a squeezing operation, means for introducing fluid pressure into said cylindrical portion for a jolt ramming operation, and means for permitting a circulation of air in the cylinder when the machine is operating as a jolt rammer.

4. A molding machine comprising in combination a cylinder having an internal upstanding post, a plunger in said cylinder having a cylindrical portion engaging said post, means for introducing fluid pressure into said cylinder for a squeezing operation, means for introducing fluid pressure into said cylindrical portion for a jolt ramming operation, and a circulation passage in the plunger permitting a flow of air in the cylinder when the machine is operating as a jolt rammer.

5. A molding machine comprising in combination a cylinder having an internal upstanding post, a plunger in said cylinder having a cylindrical portion engaging said post, means for introducing fluid pressure into said cylinder for a squeezing operation, means for introducing fluid pressure into said cylindrical portion for a jolt ramming operation, a passage in the wall of the plunger to provide for circulation of the air in the cylinder when the machine is operating as a jolt rammer, and a valve member adapted to close said passage when the machine is operating as a squeezer.

6. A molding machine comprising in combination a cylinder having an internal upstanding post, a plunger in said cylinder having a cylindrical portion engaging said post, means for introducing fluid pressure into said cylinder for a squeezing operation, means for introducing fluid pressure into said cylindrical portion for a jolt ramming operation, a passage in the wall of the plunger to provide for circulation of the air in the cylinder when the machine is operating as a jolt rammer, and a valve member adapted to close said passage when the machine is operating as a squeezer and serving as an impact member when the machine is operating as a jolt rammer.

7. A molding machine comprising in combination, a cylinder, a plunger therein, means for introducing fluid pressure into said cylinder to raise the plunger for a squeezing operation, means for jolting said plunger for a jolt ramming operation, and a relief passage for permitting free flow of air in the cylinder when the plunger is operating as a jolt rammer.

8. A molding machine comprising in combination, a cylinder, a plunger therein, means for introducing fluid pressure into said cylinder to raise the plunger for a squeezing operation, means for jolting said plunger for a jolt ramming operation, a relief passage for permitting free flow of air in the cylinder when the plunger is operating as a jolt rammer, and a valve member closing said passage upon introduction of pressure for the squeezing operation.

9. A molding machine comprising in combination, a cylinder, a plunger therein, means for introducing fluid pressure into said cylinder to raise the plunger for a squeezing operation, means for jolting said plunger for a jolt ramming operation, a relief passage for permitting free flow of air in the cylinder when the plunger is operating as a jolt rammer, and a valve member closing said passage upon introduction of pressure for the squeezing operation, said valve member acting as an impact member upon which the plunger impacts during the jolt ramming operation.

10. A molding machine comprising in combination, a cylinder, a plunger therein, means for introducing fluid pressure into the cylinder beneath the plunger to raise the latter, said plunger having a relief or surge passage, and a combined impact and valve member closing said passage upon introduction of pressure and receiving the impact of the plunger comprising a disk like flexible member and a distending means therefor.

11. A molding machine comprising in combination a cylinder having an internal upstanding post, a plunger in said cylinder having a cylindrical portion engaging said post, means for introducing fluid pressure into said cylinder for a squeezing operation, and means for introducing fluid pressure into said cylindrical portion for a jolt ramming operation.

12. A combined squeeze and jolt ramming molding machine comprising in combination a cylinder member, a plunger member, one of said members having a cylindrical portion and the other of said members having a plunger portion working in said cylindrical portion, means for introducing pressure into said cylinder member for a squeezing operation, and means for introducing pressure into said cylindrical portion for a jolt ramming operation.

13. A combined squeeze and jolt ramming molding machine comprising in combination a cylinder provided with an internal post, a plunger in said cylinder provided with a cylindrical portion engaging said post, means for introducing fluid pressure into the cylinder beneath the plunger, means for introducing fluid pressure into said cylindrical portion, and means for breaking vacuum in the machine when it is being operated as a jolt rammer.

14. A molding machine comprising in combination, a cylinder, a plunger therein, means for raising the plunger for a squeezing operation, means for jolting said plunger for a jolt ramming operation, and a relief means for permitting a free circulation of air when the machine is operating as a jolt rammer.

15. A combined jolt ramming and squeezing molding machine comprising in combination a mold table, a fluid pressure actuated squeezer mechanism for said table, and a jolting means for said table within said squeezer mechanism.

16. A combined jolt ramming and squeezing molding machine comprising in combination a mold table, a fluid pressure actuated squeezer mechanism for said table, and a fluid pressure actuated jolting mechanism for said table within said squeezer mechanism.

17. A combined jolt ramming and squeezing molding machine comprising in combination a mold table, a cylinder, a plunger working in said cylinder for operating the machine as a squeezer, said plunger having an internal cylindrical portion, a second plunger working within said cylindrical portion for operating said machine as a jolt rammer, means for introducing fluid pressure into said cylinder for a squeezing operation, and means for introducing fluid pressure into said cylindrical portion for a jolt ramming operation.

18. A combined jolt ramming and squeezing molding machine comprising in combination a mold table, a mechanism for operating said table for a squeezing operation, and a second mechanism for operating said table for a jolt ramming operation, one of said mechanisms being within the other.

In testimony whereof I have hereunto signed my name.

ROSE S. MUMFORD,
*Executrix of the estate of Edgar H. Mumford, deceased.*

Witness:
ARTHUR E. CRONE.